US007497985B2

(12) United States Patent
Fuchs

(10) Patent No.: US 7,497,985 B2
(45) Date of Patent: Mar. 3, 2009

(54) CHARGING DEVICE, ESPECIALLY CHARGING STOCK PREHEATER

(75) Inventor: Gerhard Fuchs, Kehl-Bodersweier (DE)

(73) Assignee: Fuchs Technology AG, Weinfelden (CH)

( * ) Notice: Subject to any disclaimer, the term of this patent is extended or adjusted under 35 U.S.C. 154(b) by 469 days.

(21) Appl. No.: 10/580,667

(22) PCT Filed: Nov. 25, 2004

(86) PCT No.: PCT/EP2004/013355

§ 371 (c)(1),
(2), (4) Date: May 26, 2006

(87) PCT Pub. No.: WO2005/052481

PCT Pub. Date: Jun. 9, 2005

(65) Prior Publication Data

US 2007/0013112 A1 Jan. 18, 2007

(30) Foreign Application Priority Data

Nov. 27, 2003 (DE) ................................ 103 55 549

(51) Int. Cl.
*B65G 25/10* (2006.01)
*F27D 3/04* (2006.01)
*F27D 3/10* (2006.01)

(52) U.S. Cl. ....................... 266/177; 266/901; 266/176; 414/147; 414/160; 414/187; 383/79; 383/80; 383/81; 198/717; 198/719; 432/11

(58) Field of Classification Search ......... 266/176–177, 266/199, 901; 414/147, 150–152, 157, 159, 414/160, 166, 167, 171, 172, 187, 216, 17, 414/18; 373/79–81; 198/719, 721, 736, 198/747
See application file for complete search history.

(56) References Cited

U.S. PATENT DOCUMENTS 4,119,792 A 10/1978 Elsner et al.

(Continued)

FOREIGN PATENT DOCUMENTS

JP 07180975 7/1995

(Continued)

OTHER PUBLICATIONS

PCT/EP2004/013355 International Search Report and Written Opinion dated Aug. 29, 2006, 6 pages.

*Primary Examiner*—Melvin Curtis Mayes
*Assistant Examiner*—James Corno
(74) *Attorney, Agent, or Firm*—Michael Best & Friedrich LLP

(57) ABSTRACT

To facilitate a trouble-free charging of scrap metal having differing constitutions, such as light and heavy scrap metal, from a lower discharge opening of a shaft-shaped charging device or a charging stock preheater (1) into a melting vessel by a pusher (13), the lateral surfaces of the pusher (13) are formed so as to converge from the upper side to the lower side and the actuating device (2) of the pusher (13) is pivotably supported in a frame structure (3) about a horizontal axis. In addition, the upper boundary of the discharge opening for the charging stock from the shaft (2) is preferably formed by a horizontal, rotatably supported roller (26), more preferably with engaging elements (30) distributed around the circumferential surface. Sections of the charging device that are severely mechanically stressed are preferably formed by steel billet sections connected to form a structural unit.

24 Claims, 4 Drawing Sheets

U.S. PATENT DOCUMENTS

| | | | |
|---|---|---|---|
| 4,197,422 A | | 4/1980 | Fuchs et al. |
| 4,259,539 A | | 3/1981 | Elsner et al. |
| 4,397,026 A | | 8/1983 | Fuchs |
| 4,497,475 A | | 2/1985 | Fuchs et al. |
| 4,592,067 A | | 5/1986 | Fuchs et al. |
| 4,603,424 A | | 7/1986 | Fuchs et al. |
| 4,617,673 A | | 10/1986 | Fuchs et al. |
| 4,647,021 A | | 3/1987 | Fuchs |
| 4,696,013 A | | 9/1987 | Ehle et al. |
| 5,117,438 A | | 5/1992 | Ehle et al. |
| 5,153,894 A | | 10/1992 | Ehle et al. |
| 5,393,037 A | | 2/1995 | Ehle et al. |
| 5,513,206 A | * | 4/1996 | Mori et al. .................... 373/80 |
| 5,645,791 A | | 7/1997 | Fuchs et al. |
| 5,882,578 A | | 3/1999 | Fuchs et al. |
| 6,274,081 B1 | | 8/2001 | Fuchs |
| 6,393,043 B1 | | 5/2002 | Fuchs |
| 6,404,800 B1 | | 6/2002 | Fuchs |
| 6,553,055 B2 | | 4/2003 | Fuchs |
| 6,596,221 B1 | | 7/2003 | Fuchs |
| 7,374,716 B2 | | 5/2008 | Fuchs |

FOREIGN PATENT DOCUMENTS

| | | |
|---|---|---|
| JP | 7180975 | 7/1995 |

* cited by examiner

CHARGING DEVICE, ESPECIALLY CHARGING STOCK PREHEATER

CROSS-REFERENCE

This application is the US national phase of International Application No. PCT/EP2004/013355 filed Nov. 25, 2004, which claims priority to German patent application no. 103 55 549.8 filed Nov. 27, 2003.

1. TECHNICAL FIELD

The invention relates to a charging device for charging stock into a melting vessel. The invention relates more particularly to a charging device of said type designed as a charging stock preheater, in which the material to be charged into the melting vessel is preheated by flowing heated gases through the preheater, preferably the hot exhaust gases from the melting furnace that will be charged with the stock material.

2. BACKGROUND ART

A charging device of this type designed as a charging stock preheater is known, for example, from JP 7-180975 A.

In charging devices of this type, problems arise when, during the charging of steel scrap, charging stock of widely varying size, such as in the form of chips, railway rails, engine blocks, etc, are to be heated in the charging stock preheater without being sorted first and then conveyed in batches to the discharge opening and charged into a melting vessel. The pusher, which is rigidly moved back and forth by a linear drive, easily becomes jammed by smaller pieces of scrap. In addition, when the pusher is pushed forward from the retracted position, which exposes the shaft floor, toward the discharge opening, and especially when the pusher is not formed too planar, bulky pieces of charging stock are pressed against the upper edge of the discharge opening of the shaft, where they then interfere with the transport process. In the known charging stock preheater, the susceptibility to malfunction during material transport is certainly reduced somewhat in that blocking elements are provided on two levels, by means of which the column of charging stock can be divided into smaller amounts and then discharged. Blocking elements of this type, however, are cumbersome and are also vulnerable to impact loads during the introduction of heavy scrap into the charging stock preheater.

SUMMARY

It is an object of the invention to design a charging device of the type indicated above in such a way that charging stock of widely differing sizes, such as heavy and light scrap, can be transported to the discharge opening and discharged from it by the pusher without the occurrence of the previously mentioned problems, that is, without malfunctions or blockages. In particular, this should also be ensured in the case of a charging device designed as a charging stock preheater.

A charging device for charging stock into a melting vessel according to the present teachings preferably comprises a shaft having shaft walls held in a frame structure, a lower shaft floor, an upper inlet opening for charging stock, a discharge opening for charging stock in a side wall in the lower area of the shaft, a pusher with a top surface, a bottom surface, an end surface transverse to the pushing direction, and two side surfaces parallel to the pushing direction. The bottom surface of the pusher preferably is designed to rest on the top surface of the shaft floor and is displaceable by a first actuating device between a retracted first position, which exposes the shaft floor, and a second position, which is advanced toward said discharge opening, for the batch transport of the charging stock present in the shaft towards and out through said discharge opening In the inventive charging device, the lateral surfaces of the essentially cuboid-shaped pusher are designed to converge from the top surface to the bottom surface, and the actuating device for this pusher is supported in a frame structure so as to pivot about a horizontal axis. As a result, when the pusher is pushed forward from the retracted position toward the discharge opening, it is possible for the pusher to divert upwards when there is the danger of jamming along the lateral surfaces, because any obstacle, which may be present in the gap between the lateral surfaces and the adjacent walls, pushes the pusher upward via the slanted surface.

The upper boundary of the discharge opening for the charging stock is preferably formed by a horizontal, rotatably supported roller. This roller preferably guides the charging stock over the edge, so that it cannot jam there. The roller is preferably supported so that it is pivotable about a horizontal axis and is pressable downwardly by an actuating device. As a result, the roller can upwardly displace by pivoting against its own weight or against a biasing force, whereby the height of the discharge opening is increased. By means of engaging elements disposed on the circumferential surface of the roller, it is ensured that the emerging charging stock moves the circumferential surface of the roller along with it and rolls over the surface of the roller without any relative movement with respect to the roller.

The interior space of the charging stock preheater bounded by the shaft walls, especially the lower area of this space, is preferably designed rectangularly in horizontal cross section. If the discharge opening extends over the entire length of the longer side, a more-or-less cuboid-shaped pusher, the sides of which extend to the walls, discharges a relatively large amount from the charging stock preheater with a single stroke.

To connect the charging device to a melting vessel, a projection with a flange or in the form of a sleeve can be provided at the discharge opening, which projection enables a gas-tight connection with the charging opening of the melting vessel; the opening is preferably located in the side of the upper vessel of the melting vessel. The charging device is preferably designed so that it is horizontally movable and for this purpose has either an undercarriage or a roller base. In this case, a sleeve connection is especially advantageous, because a quick connection to the vessel and a quick separation from the vessel is possible, which seems to be advantageous especially when the electric-arc furnace has a tilting vessel. The melting furnace preferably has an oval vessel, wherein the charging opening to be connected to the discharge opening of the charging device is provided in a longitudinal side of the oval.

With respect to the goal of providing the charging stock preheater with a robust and reliable design that makes it possible an unsorted usage of heavy and light scrap, the mechanically stressed parts of the shaft and/or pusher are preferably made of sections of steel billet, arranged adjacent to each other and connected to form a structural unit. A tight connection of the adjacently arranged sections of steel billet is preferably achieved by interleaved sections of steel rod, which are located on the thermally and mechanically stressed side of the structural unit. These rods make possible a certain elasticity in the direction transverse to the steel billets, as well as a good cooling capability by spray-cooling of the opposite side. The sections of steel billet should be arranged vertically in the wall areas of the shaft.

BRIEF DESCRIPTION OF THE DRAWINGS

The invention is explained in greater detail on the basis of eight figures, in which.

DETAILED DESCRIPTION OF THE INVENTION

Figure 1:
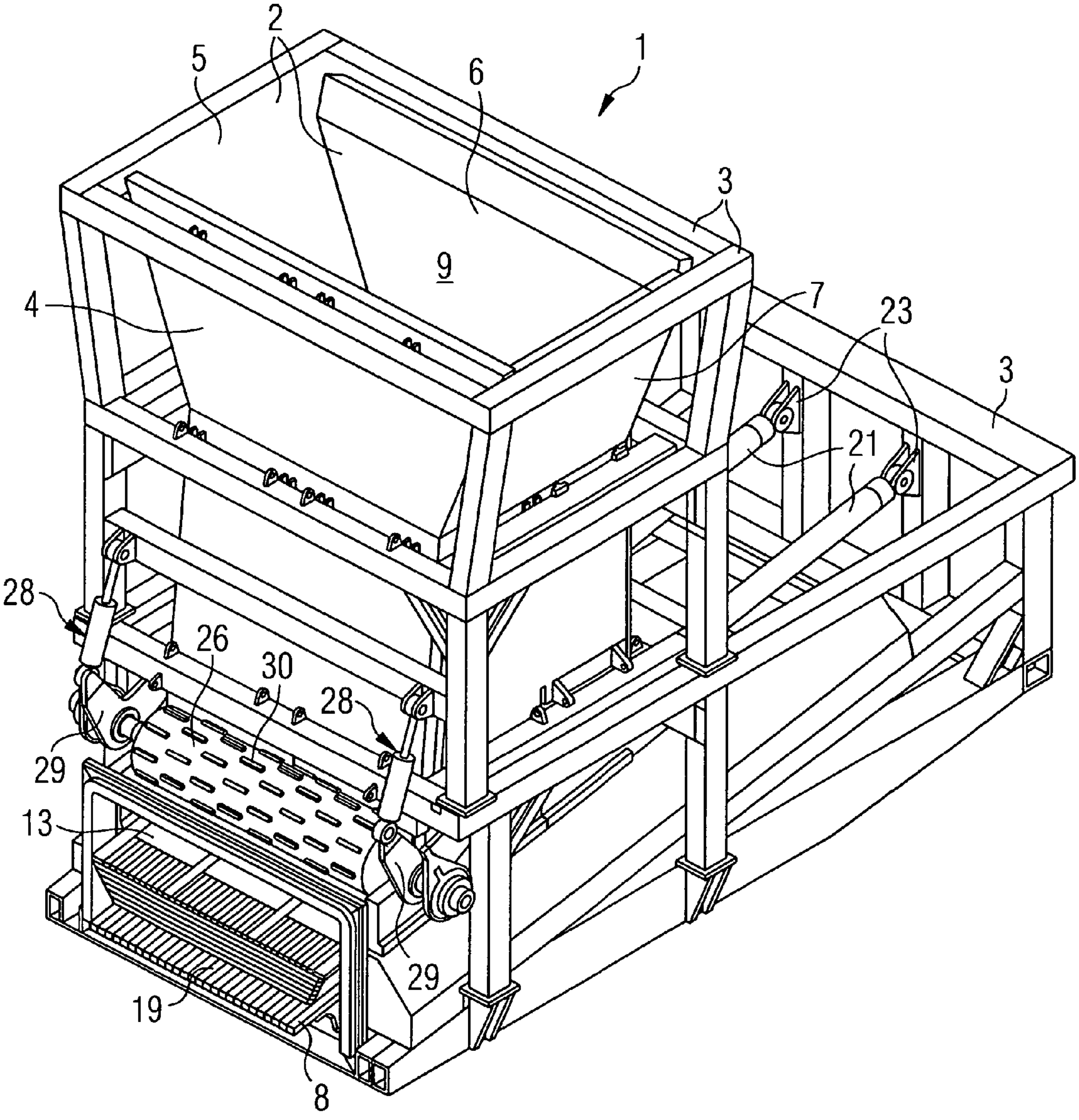
FIG. 1 shows a perspective view of an inventive charging device designed as a charging stock preheater.

The shaft-shaped charging stock preheater 1 shown in perspective in FIG. 1 for the preheating of the charging stock to be charged into a melting vessel comprises a shaft 2 with shaft walls 4, 5, 6, 7 held in a frame structure 3. Also provided are a lower shaft floor 8 and an upper charging stock inlet opening 9 that is closable by a cover 10 (See FIG. 2). In the lower area of the shaft 2, in the side wall 4 appearing on the left in the diagram according to FIG. 2, a discharge opening 11 for the charging stock is provided, which simultaneously forms a gas inlet for heating gas that can be utilized to heat the charging stock present in the shaft. A gas outlet 12 is present in the upper area of the shaft 2.

Figure 2:
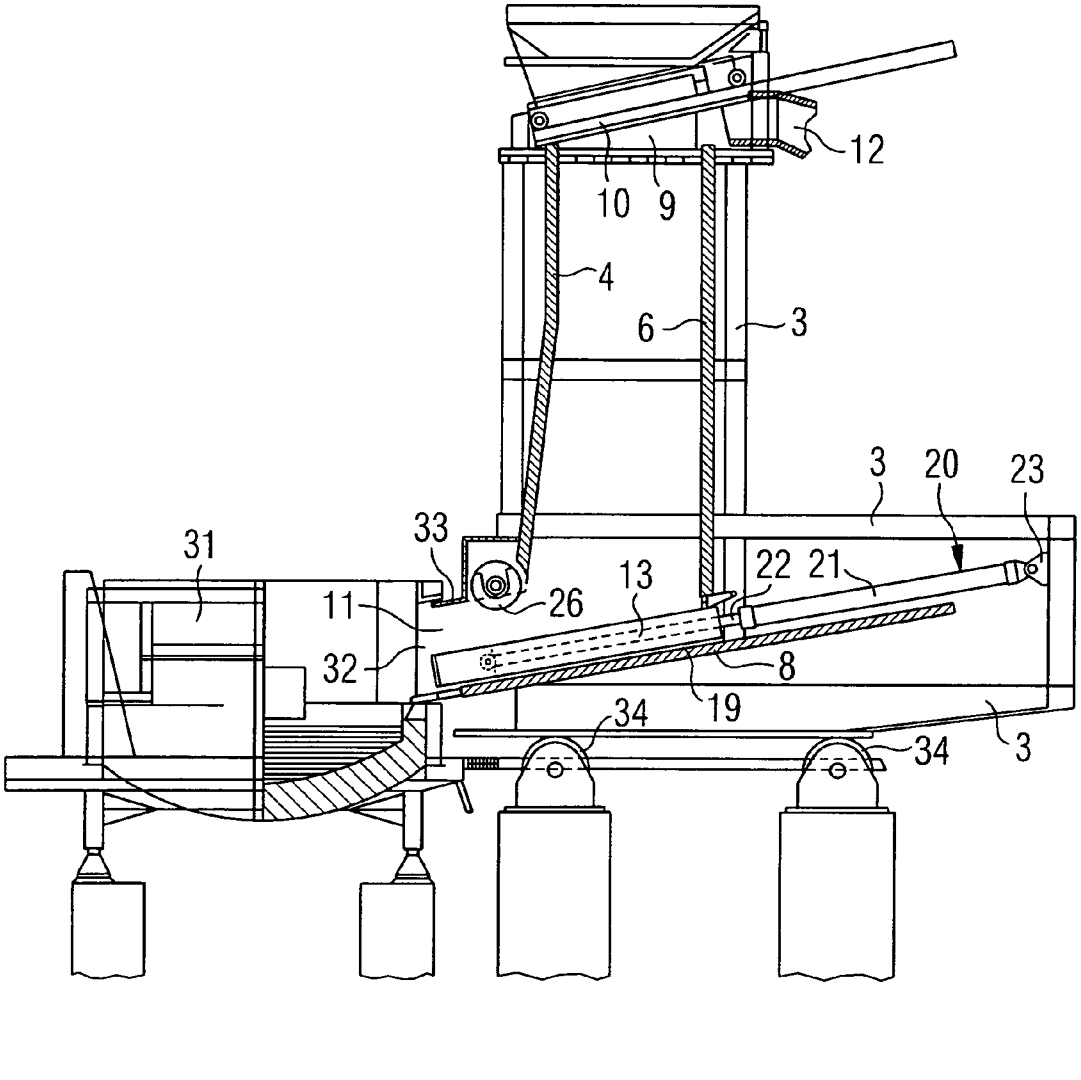
FIG. 2 shows a schematic diagram, in partial longitudinal section, of the charging device connected to the upper vessel of an electric-arc furnace.
Figure 3:
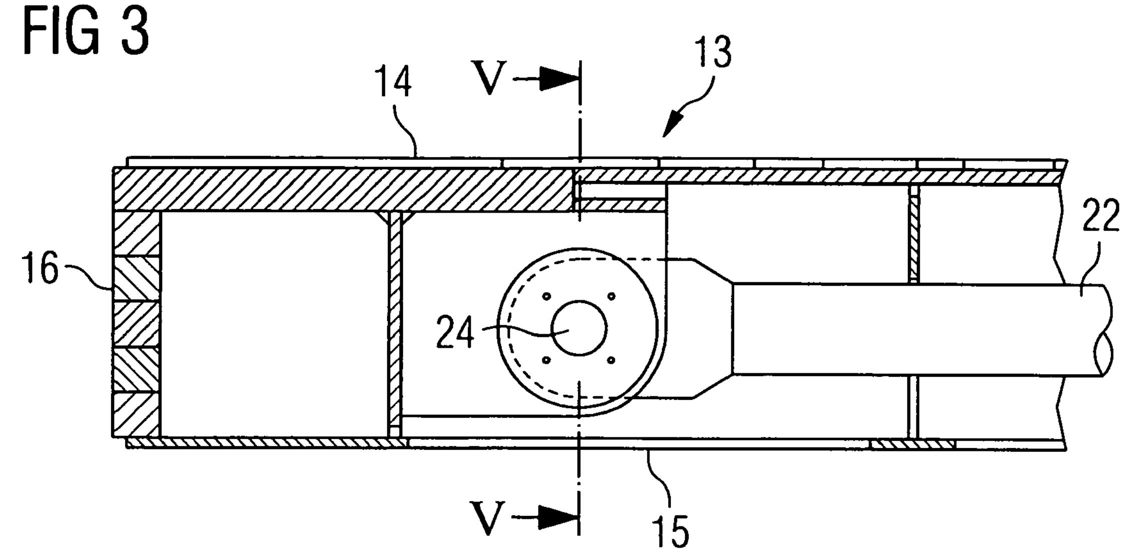
FIG. 3 shows a longitudinal cross section of the front part of a pusher.
Figure 4:
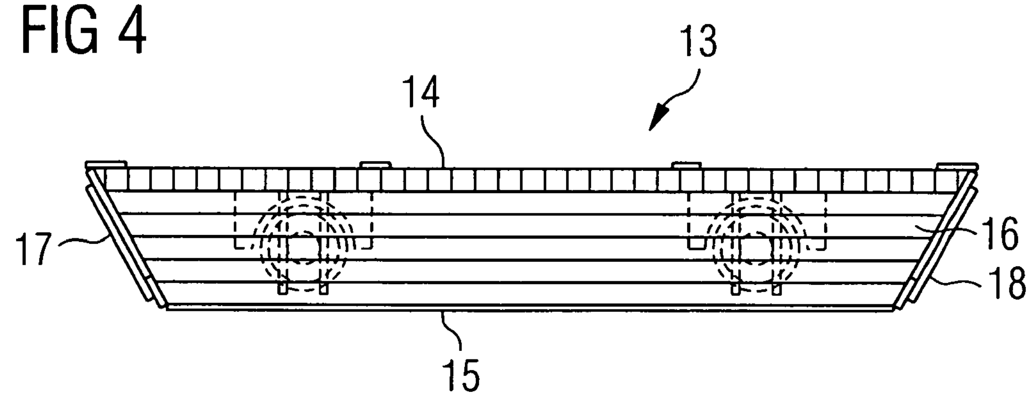
FIG. 4 shows an end view of the pusher.
Figure 5:
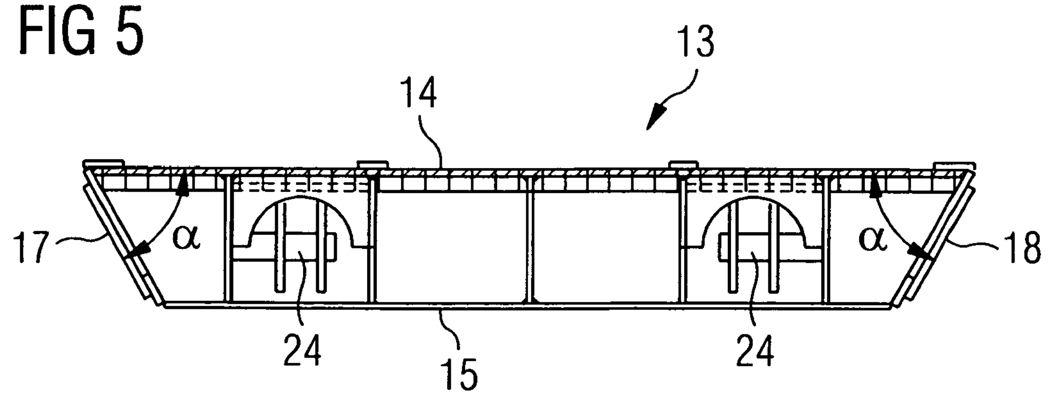
FIG. 5 shows cross section V-V of FIG. 3.

The charging stock preheater also contains a pusher 13, which is shown in FIGS. 3-5 in various partial and enlarged views. The pusher 13 has a top surface 14, a bottom surface 15, an end surface 16 transverse to the pushing direction, and two lateral surfaces 17, 18 parallel to the pushing direction. The pusher 13 rests with its bottom surface 15 on the top surface 19 of the shaft floor 8 and is movable between a retracted, first position (not shown), which exposes the shaft floor inside the shaft walls, and a second position, which is advanced toward the discharge opening 11 (shown in FIGS. 1 and 2). So that the pusher 13 is also guided when in the retracted first position, the shaft floor 8 is extended beyond the shaft wall 6, which shaft wall is disposed rearward of the discharge opening 11. The forward- and rearward-pushing of the pusher 13 takes place by a first actuating device 20, which, in the case illustrated herein, is in the form of two linear drives, each formed of a hydraulic cylinder 21 and a lifting rod 22. The first actuating device 20 is supported in the frame structure 3 so as to pivot about a horizontal axis. For this purpose, pivot bearings 23 are provided on the frame 3, one for each of the hydraulic cylinders 21. As FIGS. 3 and 5 show, the lifting rods 22 are also pivotably connected to the pusher 13 by horizontal pins 24. As a result, the pusher is provided with the necessary freedom of movement to avoid jamming during the forward and reverse movement.

The top surface 19 of the shaft floor 8 is preferably designed with a downward slant toward the discharge opening 11 of the shaft 2. An inclination angle of 15 degrees to the horizontal has proved to be advantageous. The inclination angle should not be greater than 45 degrees, because otherwise the required blocking of the charging stock discharge is no longer possible and charging stock will be discharged through the discharge opening 11 in an uncontrolled manner.

The convergence angle $\alpha$ (see FIG. 5) of the converging lateral surfaces 17, 18 of the pusher 13 with respect to the horizontal is preferably between 45 degrees and 75 degrees. Approximately 60 degrees has proved to be especially advantageous.

Figure 6:
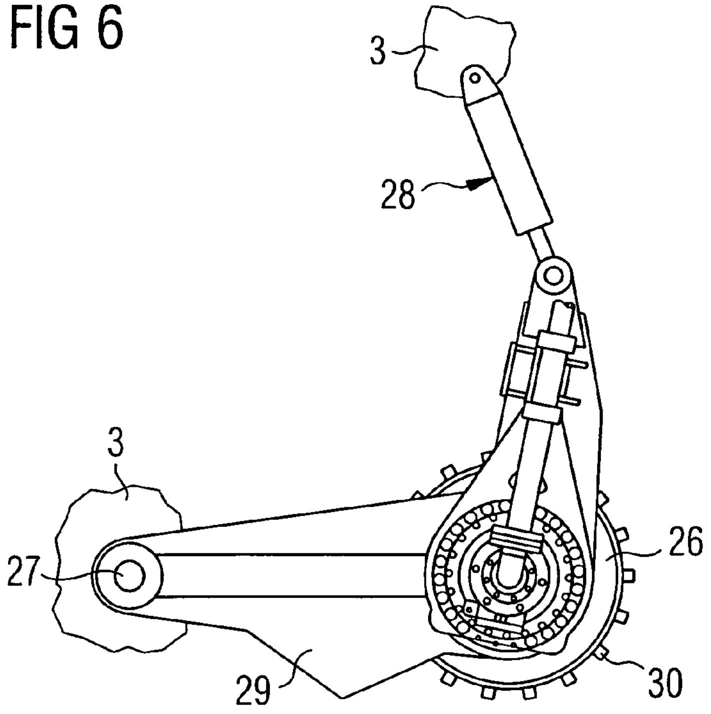
FIG. 6 shows the pivot lever support of the engaging roller.

To avoid blockage at the upper boundary of the discharge opening 11 during the discharge of the unsorted scrap metal, the upper boundary is formed by a horizontal, rotatably supported roller 26. The roller 26 is supported in the frame construction 3 so as to pivot about a fixed horizontal axis 27 (see FIG. 6) and is downwardly pivotable or pushable by a second actuating device 28. FIG. 6 shows a view, from the left, of the left pivot lever 29 of FIG. 1. The second actuating device 28, like the first actuating device 21, is designed in the form of two linear drives, by means of which the roller 26 is pivotable around the aligned axes 27 with the help of the pivot levers 29 assigned to the roller 26.

The roller 26 includes engaging elements 30, which are distributed around the circumferential surface. In the present case, these elements are designed as engaging ribs, which are parallel to the axial direction of the roller. When the charging stock is discharged from the shaft by the pusher 13, the engaging elements 30 engage with the transported material and the freely rotating roller 26 is thereby rotated. As a result, the material is discharged freely, without the danger of jamming, even in the upper area of the edge of the discharge opening 11, wherein the roller, due to its pivoting movement, can compensate for height changes caused by the transported charging stock. The roller 26 could also be drivably designed, so that it can positively convey the material in the area of the upper edge of the discharge opening 11. In this case, the rotational movement of the roller 26 should be synchronized with the pushing movement of the pusher 13.

The charging device, designed as a charging stock preheater, is preferably intended for the preheating of charging stock to be charged into a melting vessel, especially into the melting vessel of an electric-arc furnace. For this purpose, it is advantageous if the connection between the charging stock preheater and the melting vessel can be released quickly, so that, when the vessel is tilted, the charging stock preheater does not have to be tilted as well. On the other hand, it should be possible to introduce the hot exhaust gas from the electric-arc furnace through the charging stock discharge opening 11, which serves as a gas inlet, into the shaft 2 without significant losses; after that, the gas flows through the charging stock to be heated and is then exhausted through the upper gas outlet 12.

In FIG. 2, such a connection between the charging stock preheater 1 and a tiltable vessel 31 of an electric-arc furnace is shown. The upper part of the vessel 31, usually comprised of water-cooled wall elements, is provided with a rectangular inlet opening 32 for the charging stock. The vessel 31 preferably has an oval shape in top view, so that it is easier to provide a rectangular inlet opening 32 here. At the discharge opening 11 of the charging stock preheater 1, a projection 33, surrounding the opening, is provided for connection to the inlet 32 of the melting vessel, which inlet serves as the charging opening. The projection is designed in the form of a sleeve, whose external contour is adapted to the internal contour of the charging opening 32 for insertion into that opening. Moreover, the charging stock preheater 1 is designed so that it is displaceable. For this purpose, the frame 3 is horizontally portable on rollers 34 in a direction transverse to the tilting direction of the melting vessel 31. Before the melting vessel 31 is tilted for pouring a molten mass, the connection between the sleeve 33 and the charging opening 32 is released by moving the charging stock preheater 1 to the right according to the illustration of FIG. 2.

The inventive charging stock preheater is suitable for large mechanical loads. For the purpose of increasing the robustness and reliability of the device as compared to known charging stock preheaters, the parts of the shaft 2 and/or of the pusher 13 subjected to severe mechanical loads are, according to a further development of the invention, formed from sections 41 of steel billet, which are arranged adjacent to each other and are connected to form a structural unit 40.

Figure 7:
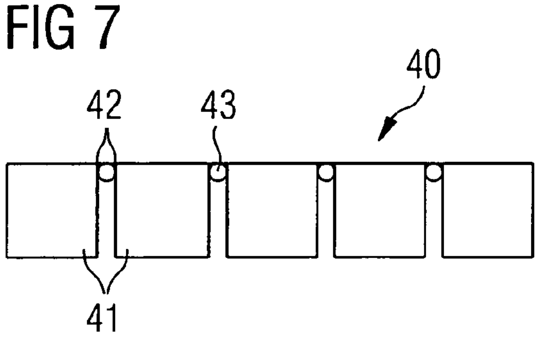
FIGS. 7 and 8 show a front view and a plan view of a structural unit formed by sections of steel billet.
Figure 8:
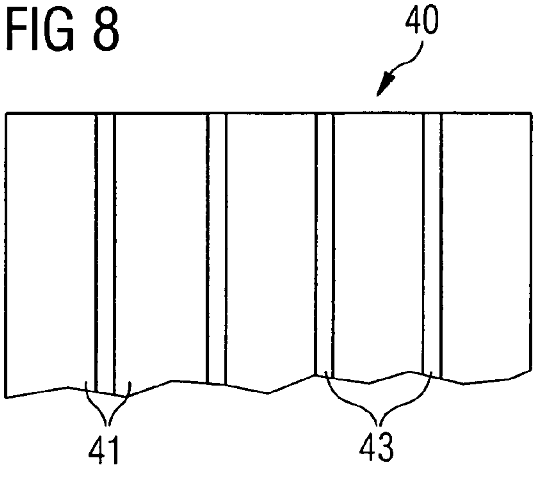

FIG. 7 shows an end view of a structural unit of this type and FIG. 8 shows a top view. The sections 41 of steel billet are welded together at the edges 42, which lie on the mechanically stressed side of the structural unit 40, via interleaved sections 43 of steel rod, wherein these sections of steel rod are preferably made of round steel. In the described charging stock preheater, the areas subjected to severe mechanical loads are the inside surfaces of the shaft walls 4, 5, 6, and/or 7, the top surface of the shaft floor 19 in the area of the shaft and/or the end surface 16 of the pusher and a portion of the adjacent top surface of the pusher 13.

Preferred cross-sectional dimensions of steel billets commercially obtainable on the steel market for the production of the lengths of steel billet are 100 mm×100 mm. The diameter of the section 43 of round steel is preferably one-fifth of the cross-sectional dimensions of the steel billets, in the present case approximately 20 mm.

In this embodiment, a required cooling of the shaft walls advantageously takes place by spray cooling, i.e., via spray nozzles, which are installed in the frame structure 3. Because the cooling occurs on the side of the structural unit opposite the sections of steel rod, the billet sections 41 are also coolable via the intermediate spaces between adjacent billet sections, which spaces are formed by the interleaved sections of steel rod 43.

The invention claimed is:

1. A charging device for charging of charging stock into a melting vessel, comprising:

a shaft having shaft walls held in a frame structure, a shaft floor, an upper inlet opening arranged to receive the charging stock, and a discharge opening arranged to discharge the charging stock through a side wall located in a lower portion of the shaft, a pusher having a top surface, a bottom surface, an end surface transverse to a pushing direction, and two lateral surfaces parallel to the pushing direction, the lateral surfaces converging from the top surface to the bottom surface of the pusher, wherein the pusher is arranged and constructed to rest with its bottom surface disposed on an upper surface of the shaft floor, and a first actuating device supported in or on the frame structure so as to be pivotable about a horizontal axis, the first actuating device being arranged and constructed to move the pusher between a first, retracted position, which exposes the shaft floor, and a second position, which is advanced toward the discharge opening, for batch transporting of charging stock present in the shaft toward and through the discharge opening.

2. A charging device according to claim 1, wherein an upper boundary of the discharge opening of the shaft is formed by a horizontal, rotatably supported roller.

3. A charging device according to claim 2, wherein the roller is supported so as to pivot about a horizontal axis.

4. A charging device according to claim 3, further comprising a second actuating device arranged and constructed to downwardly push the roller.

5. A charging device according to claim 4, wherein at least one of the first and second actuating devices is formed as a linear drive.

6. A charging device according to claim 4, wherein the roller comprises engaging elements distributed around its circumferential surface.

7. A charging device according to claim 6, wherein the engaging elements are formed as engaging ribs.

8. A charging device according to claim 7, wherein at least one of the first and second actuating devices is formed as a linear drive.

9. A charging device according to claim 8, wherein the shaft walls define a rectangularly-shaped interior space within the shaft when viewed in horizontal cross section.

10. A charging device according to claim 9, further comprising a projection surrounding the discharge opening of the shaft, the projection being arranged and constructed to connect to a charging opening of a melting vessel.

11. A charging device according to claim 10, wherein the projection is designed in the form of a sleeve having an external contour adapted to an internal contour of the charging opening so as to be inserted into the charging opening.

12. A charging device according to claim 11, wherein the charging device is designed to be portable.

13. A charging device according to claim 12, further comprising at least one of an undercarriage or rollers arranged and constructed to permit displacement of the frame structure of the shaft.

14. A charging device according to claim 13, wherein portions of at least one of the shaft and the pusher that are subject to severe mechanical stresses are formed from sections of steel billet arranged adjacent to each other and connected to each other to form a structural unit.

15. A charging device according to claim 14, wherein the sections of steel billet are welded together along edges on at least one thermally and/or mechanically stressed side of the structural unit and wherein sections of steel rod are interleaved between the sections of steel billet.

16. A charging stock preheater comprising:

the charging device according to claim 15, a cover arranged and constructed to close the upper inlet opening of the shaft and a gas outlet provided in an upper portion of the shaft, the gas outlet being arranged to exhaust heated gas introduced into the shaft via the discharge opening for heating charging stock present in the shaft.

17. A charging stock preheater according to claim 16, wherein the frame structure further comprises at least one spray water cooling device having spray nozzles directed towards thermally stressed sections of the side walls of the shaft.

18. A charging device according to claim 1, further comprising a projection surrounding the discharge opening of the shaft, the projection being arranged and constructed to connect to a charging opening of a melting vessel.

19. A charging device according to claim 18, wherein the projection is designed in the form of a sleeve having an external contour adapted to an internal contour of the charging opening so as to be inserted into the charging opening.

20. A charging device according to claim 1, further comprising at least one of an undercarriage or rollers arranged and constructed to permit displacement of the frame structure of the shaft.

21. A charging device according to claim 1, wherein portions of at least one of the shaft and the pusher that are subject to severe mechanical stresses are formed from sections of steel billet arranged adjacent to each other and connected to each other to form a structural unit.

22. A charging device according to claim 21, wherein the sections of steel billet are welded together along edges on at least one thermally and/or mechanically stressed side of the structural unit and wherein sections of steel rod are interleaved between the sections of steel billet.

23. A charging stock preheater comprising:

the charging device according to claim 1, a cover arranged and constructed to close the upper inlet opening of the shaft and a gas outlet provided in an upper portion of the shaft, the gas outlet being arranged to exhaust heated gas introduced into the shaft via the discharge opening for heating charging stock present in the shaft.

24. A charging stock preheater according to claim 23, wherein the frame structure further comprises at least one spray water cooling device having spray nozzles directed towards thermally stressed sections of the side walls of the shaft.

* * * * *